United States Patent [19]
Majette et al.

[11] Patent Number: 6,086,181
[45] Date of Patent: Jul. 11, 2000

[54] MAXIMUM-DIAGONAL PRINT MASK AND MULTIPASS PRINTING MODES, FOR HIGH QUALITY AND HIGH THROUGHPUT WITH LIQUID-BASE INKS

[75] Inventors: Mark W. Majette; Shailendra Kumar, both of San Diego, Calif.

[73] Assignee: Hewlett-Packard Company, Palo Alto, Calif.

[21] Appl. No.: 08/682,864

[22] Filed: Jul. 2, 1996

[51] Int. Cl.[7] .............................. B41J 29/38; B41J 2/145
[52] U.S. Cl. .................................. 347/16; 347/40
[58] Field of Search .................. 347/40, 41, 43, 347/16

[56] References Cited

U.S. PATENT DOCUMENTS

| | | | |
|---|---|---|---|
| 4,940,998 | 7/1990 | Asakawa | 346/140 R |
| 5,455,610 | 10/1995 | Harrington | 347/43 |
| 5,598,191 | 1/1997 | Kneezel | 347/40 |
| 5,600,353 | 2/1997 | Hickman et al. | 347/43 |
| 5,677,716 | 10/1997 | Cleveland | 347/37 |
| 5,684,517 | 11/1997 | Clemente et al. | 347/43 |
| 5,724,079 | 3/1998 | Helinski et al. | 347/43 |
| 5,805,183 | 9/1998 | Lidke et al. | 347/41 |
| 5,850,237 | 12/1998 | Slade | 347/23 |

*Primary Examiner*—Safet Metjahic
*Assistant Examiner*—Christopher E. Mahoney

[57] ABSTRACT

Full-color swaths produced in opposite scanning directions are offset to conceal or eliminate the color-cast effects of the varying deposition order which is inherent in bidirectional operation with in-line pens. Offsets are produced by unequal printing-medium advance between oppositely directed sweeps, or by alternating forward and reverse advance steps between oppositely directed sweeps, or by both unequal and alternate-reverse steps; or by pen masking. Color-cast effects of varying drying/wicking time, too, are minimized.

20 Claims, 7 Drawing Sheets

<> CARRIAGE MOTION
^ PAPER MOTION

< > CARRIAGE MOTION
^ PAPER MOTION

FIG. 12

PASS 12-
A B C D E F G H

S W A T H mc cm mc cm       12a-d mc cm mc cm  12e-h

MAXIMUM-DIAGONAL PRINT MASK AND MULTIPASS PRINTING MODES, FOR HIGH QUALITY AND HIGH THROUGHPUT WITH LIQUID-BASE INKS

RELATED PATENT DOCUMENTS

Five closely related documents are other, coowned United States utility-patent applications filed in the U.S. Patent and Trademark Office and copending with this document—and also hereby incorporated by reference in their entirety into this document. One of these documents is in the names of Cobbs et al., Ser. No. 08/540,908, entitled "MULTIPLE INKJET ALIGNMENT BY SCANNING A REFERENCE PATTERN AND SAMPLING SAME WITH REFERENCE TO A POSITION ENCODER" and issued as U.S. Pat. No. 5,600,350 on Feb. 1, 1997. A second such document is in the names of Sievert et al., Ser. No. 08/625,422, entitled "SYSTEMS AND METHOD FOR ESTABLISHING POSITIONAL ACCURACY IN TWO DIMENSIONS BASED ON A SENSOR SCAN IN ONE DIMENSION" and issued as U.S. Pat. No. 5,796,414 on Aug. 18, 1998. A third document is in the name of Gregory D. Raskin, Ser. No. 08/055,660, entitled "DIRECTION-INDEPENDENT ENCODER READING; POSITION LEADING & DELAY, & UNCERTAINTY TO IMPROVE BIDIRECTIONAL PRINTING" and issued as U.S. Pat. No. 5,426,457 on Jun. 20, 1995. A fourth such document is in the names of Damon Broder et al., Ser. No. 08/417,510, entitled "COMBINED CENTRAL AND LATERAL HOLD-DOWN PLATES, AND END-OF-PAGE ADVANCE-DISTANCE DECREASE, IN LIQUID-INK PRINTERS" and issued as U.S. Pat. No. 5,646,667 on Jul. 8, 1997. A fifth such document is in the names of Lance Cleveland et al., Ser. No. 08/056,633, entitled "MAXIMUM DIAGONAL PRINT MASK AND MULTIPASS PRINTING MODES, FOR HIGH QUALITY AND HIGH THROUGHPUT WITH LIQUID-BASE INKS" and issued as U.S. Pat. No. 5,677,716 on Oct. 14, 1997.

FIELD OF THE INVENTION

This invention relates generally to machines and procedures for printing graphics or text on printing media such as paper, transparency stock, or glossy media. The invention relates more particularly to a bidirectionally scanning thermal-inkjet machine and method that use inline pens to construct color images—in pertinent part by overprinting of primaries.

Printers of the type under consideration form images that include, for example, solid blocks of color, text, finely detailed pictures, and composites of these. Such images are constructed from individual ink spots created on a printing medium, in a two-dimensional pixel array. Such individual spots particularly can include spots of secondary colors, created by overprinting of two primary colors.

The invention employs print-mode techniques to optimize image quality for bidirectionally scanning in-line pens. The invention particularly addresses apparent uniformity of secondary colors—and also of complex colors, created by adjacent primaries and secondaries in various combinations—within solid blocks of color.

BACKGROUND OF THE INVENTION

Figure 1:
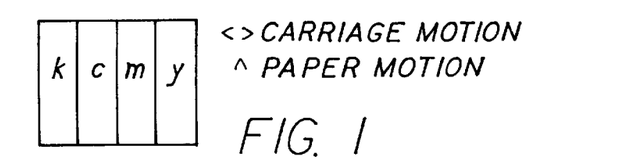
FIG. 1 is a plan of pens mounted in-line for use in preferred embodiments of the invention.

Of great commercial importance in such a printer is use of substantially in-line pens of different colors. In this type of configuration, a black pen k (FIG. 1, in which each vertical rectangle represents a separate pen), cyan pen c, magenta pen m and yellow pen y are all substantially aligned with one another—relative to the printing-medium-advance axis.

We say "substantially" because in practice it is often most economical in terms of manufacturing tolerances to allow slight misalignments of pen bodies—but to provide a few extra nozzles on each pen. Then end-masking can be selected automatically through a suitable calibration procedure to more nearly align the swaths actually produced by the several pens.

With such masking, certain nozzles are always unused, at least until one or more of the pens on a carriage is replaced. Calibration must then be done anew.

Such medium-advance-axis calibration procedures are set forth, for example, in the Cobbs and Sievert patent documents mentioned earlier. Thus, ignoring the always-unused nozzles near the ends of the pens, our reference to "substantially in-line pens" may be considered equivalent to "in-line swaths" or "in-line operating nozzle arrays".

Substantially in-line configurations are important because they minimize the length (along the printing medium) of the print zone, and thereby minimize both the overall envelope of the printing machine and the pen-to-print-medium distance. Housing a longer print zone expands the overall machine envelope—which is critical to cost, weight, installation space, inventory and shipping.

With a long print zone, commonly encountered amounts of printing-medium disturbance (flapping, crumpling, curling etc.)—per distance along the zone—accumulate to require longer pen-to-medium distance. The latter distance is critical to image quality, as longer flight distances amplify tolerances in nozzle-pointing angles. Ink drops also spread and spatter more while flying further.

A particularly long print zone also greatly complicates the configuration, weight and strength requirements of a pen carriage. These factors in turn implicate the carriage support and guide system, and thereby the drive motor, power consumption, heat dissipation etc.

Furthermore with in-line pens the procedures for printing at top and bottom of a page are simpler and easier to manage, and more importantly do not require operating with any of the pens in a position extended over the edge of the paper.

Also very important in a printer is speed, or throughput, measured as for example the number of pages that can be printed in a given time. For swath-based printers in general, the fastest and perhaps the most natural-seeming way of printing would be to abut swaths—the top of one swath immediately below the bottom of the preceding swath.

Such operation, however, would be acceptable only for a fast draft or rough preview mode of operation—or for printing text, in which swath boundaries sometimes can be kept between lines of text. Otherwise, defects in the printing tend to appear.

Such imperfections are due to irregularity in printing-medium advance mechanisms—or in nozzles near the ends of a pen. These manifest themselves very conspicuously as either shallow unprinted spaces or shallow double-printed strips, where swaths fail to abut or very slightly overlap, respectively.

A popular way of camouflaging such medium-advance defects is the use of deliberately overlapped swaths. In such a case each swath is only partially filled, so that completion of each one-swath-height-tall portion of the image actually takes more than one pass of the pens over the printing medium.

To take very simple examples, in each pass the pens may print only every other pixel row, or preferably every other pixel in an alternating checkerboard pattern. If that is done, then completion of each swath requires on average two passes.

A common way to operate in such a two-pass overlapped printing mode is to stagger successive passes by half the height of the pen array. Thus a first partially filled swath 1 (FIG. 9, in which each narrow rectangle now represents all pens that are present) is half-overlapped by a second partially filled swath 2. This pattern repeats in each successive pair 1, 2 of passes.

The simplest way to do this is to print while the pens are executing a pass 1 in one scan direction, for instance from left to right (">"in FIG. 9)—and then to return the pens to the left side of the print medium in a so-called "retrace" pass (not illustrated) as quickly as feasible in preparation for the next printing pass 2.

The benefit of a deliberate-overlap procedure is that the worst possible result of a slight imperfection in print-medium advance is a shallow space in which (for the checkerboard case) one sequence of dots appears in a given pixel row—rather than the ideal two interleaved sequences. This kind of shallow space with fifty-percent density (representing a fifty-percent error), resulting from partially-filled swaths being slightly too far apart, is far less conspicuous than a shallow space of zero density (a hundred-percent error, resulting from full swaths being too far apart).

Conversely, if partial swaths are too close together a shallow strip with three sequences of dots, rather than two, appears in a given row. The corresponding 150-percent density is far less conspicuous than a shallow strip of 200-percent density (again, errors of fifty and a hundred percent respectively).

It has been long recognized, however, that even a dead-heading retrace still takes roughly half as long as a productive printing pass, so the total cost in time for each partial swath is roughly 1½ times the actual printing time. In other words, ignoring startup and slowdown effects (and also ignoring the inefficiency of printing partially filled swaths at fifty-percent density), the time efficiency of the process is only about two-thirds.

One well-known way to mitigate this inefficiency and thus improve throughput in a scanning printer is to print bidirectionally—in other words, print dots during movement of the scanning pens in both scan directions. After each pass 1 (FIG. 10) in the forward direction (">") for each pair, the complementary pass 2 is printed on retrace ("<").

In such operation it is desirable to take care that dots formed on retrace are properly in register, along the scan axis, with those formed in forward operation. Techniques for automatically measuring and correcting such registration in the field are taught by the previously mentioned patent documents of Cobbs, Sievert, and Raskin.

In printing of text, and some finely detailed color illustrations (particularly illustrations that do not happen to include heavy usage of secondary colors), this technique is generally satisfactory, although a great deal of work has been done with far more-elaborate print modes. In some of these modes, focusing on the limited liquid absorbency of some printing media, the percentage of fill—and the advance distance as a fraction of nozzle-array height—are smaller fractions than half, and the number of passes to complete inking of a region is a greater multiple than two. These print modes are particularly useful to minimize bleed of the ink, blocking or offset onto adjacent sheets, and cockle and warping of the medium (particularly with plastic media).

In other such innovations, addressing the directionality underlying print-medium-advance defects (especially end-of-page paper shrinkage, in systems with heating to accelerate drying of the paper), particular patterns of pixels are selected for each pass, to minimize the conspicuousness of such defects. A survey of numerous compensating print-mode techniques appears in the abovementioned application of Cleveland et al.; and related end-of-page control techniques are set out in the Broder et al. application.

In particular, Broder teaches a special structure of advances near the end of a page. Such a structure includes a decreasing advance distance—and eventually a rotating print-mask sequence—in an end-of-page zone where paper position is not controlled as well as elsewhere on the page. Cleveland teaches special masking to deal with an associated arch-shaped paper shrinkage.

Figure 9:
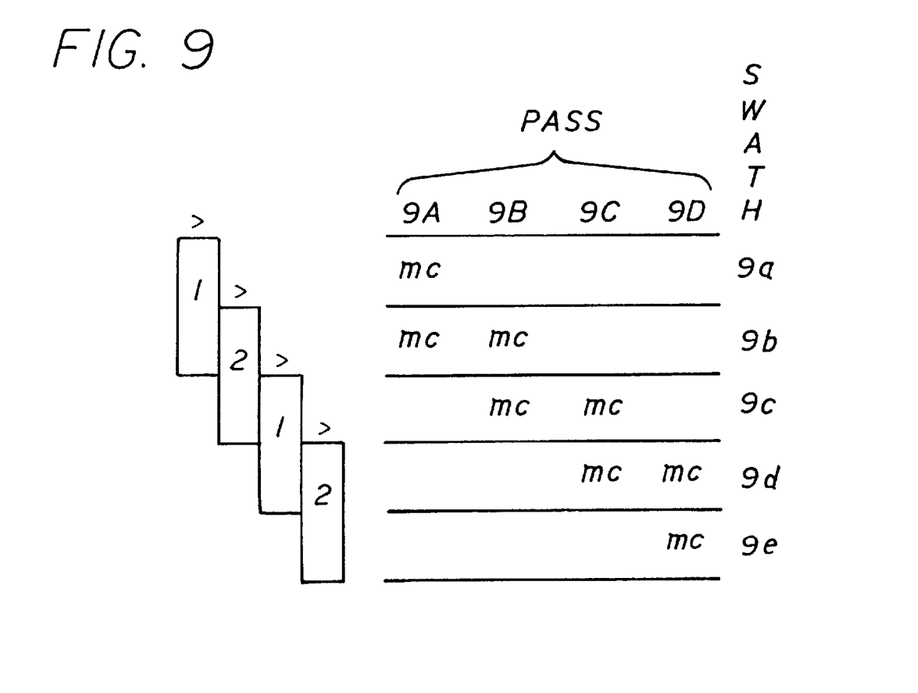
FIG. 9 is a diagram like FIGS. 2 through 5 but showing a prior-art unidirectional two-pass print mode.
Figure 10:
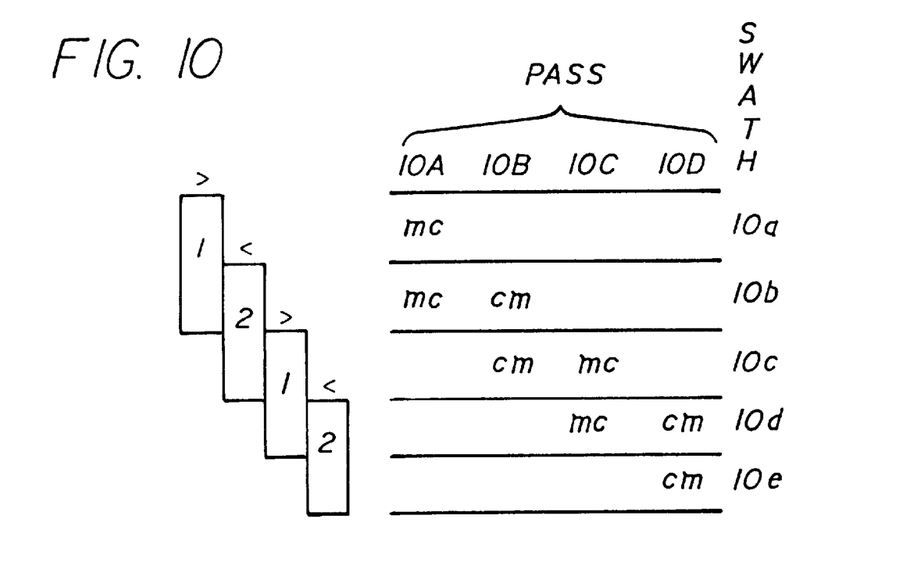
FIG. 10 is a like diagram but for a bidirectional mode.

For images that include solid blocks of color, however, and also even for some finely detailed color illustrations, a different kind of defect appears—still with reference to bidirectional printing using in-line pens (FIG. 10). Whereas a unidirectional printing regime creates secondary colors by always overprinting primaries in the same order—e.g. always magenta (m, FIG. 9) and then cyan (c) to make blue (cumulatively coded as "mc" in the FIG. 9 tabulation)—in conventional two-pass bidirectional printing the deposition order is opposite as between the forward and retrace passes.

In other words, the forward pass may deposit first m and then c (cumulatively coded as mc in FIG. 10), but on retrace the order is first c and then m (cm in FIG. 10). This difference arises because of the way, physically, in which the overprinted primaries are deposited.

Conventionally, in both unidirectional and bidirectional two-pass printing, two primaries are printed on a common pixel by discharge from two pens during the same pass. As the first pen passes over the pixel from left to right it discharges an inkdrop—which may be partly absorbed into the printing medium.

A tiny fraction of a second later a trailing pen flies over the same pixel and discharges another inkdrop on top of the first. For example if the first pen which inks the pixel is the magenta pen m (FIG. 1), and the second is the cyan pen c, the deposition sequence is mc (in FIG. 9 both columns for all rows; but in FIG. 10 the right-hand column in row 3c, and left-hand column otherwise) —with the cyan drop on top of the magenta.

On retrace of the same pens, of course the pens remain in the same physical order but they are moving in the opposite direction. This time, therefore, the cyan pen c arrives first and the magenta pen m later: the deposition sequence now is cm (left-hand column in rows 3c and 3e of FIG. 10, right-hand column otherwise), and with the magenta drop on top.

Unfortunately the ink which is deposited second tends to dominate visually, particularly if the drop from the first pass has already partly wicked into the medium. Furthermore, the second-deposited ink in the second pass dominates the second-deposited ink in the first pass, even though the second pass nominally deposits ink on different pixels than the first pass.

Perhaps this latter effect is due to the second-deposited ink in the second pass partially running off the first deposited ink onto adjacent pixels, where it overcoats both already-partly-dried inkdrops from the first pass (and where, therefore, much less wicking into the medium is now possible). In any event the overall effect of this defect can be appreciated simply by noting which color is deposited last of all in a given swath.

This can be seen for instance by comparing the right-hand column of color-deposition codes appearing in FIG. 10: m is last in row 3b, c in row 3c, and m again in row 3d. Thus the dominant color alternates at each half swath —swaths 3b and 3d are blue with a slight magenta cast, and intermediate swath 3c is blue with a slight cyan cast.

These small shifts create a banding artifact that is perceptible and objectionable in areas that should be solid blocks or regions of uniform color. The problem is similar for other secondary colors, and also for halftoned colors in solid blocks.

As mentioned above, even some finely detailed color illustrations exhibit this same artifact. This effect is strongly dependent upon the nature of each illustration.

More specifically, the artifact is particularly likely to arise where usage of secondary colors is particularly heavy— sometimes even with black overprinted on a color—if the finely detailed character of the image is not sufficient to break up the resulting banding pattern. To consider just one simple example: if an image region has many fine details of different colors but they are nearly all secondaries, then all of those different secondary colors as they appear in adjacent swaths of similar subject matter will appear as two different sets of slightly shifted secondary colors.

Thus the problem which we address is this: in bidirectional color printing with in-line pens which essentially print all colors in every pass, how can we avoid color shifts caused by deposition order—or at least minimize their conspicuousness?

One previous attempt to resolve a related problem appears in U.S. Pat. No. 4,855,752 of Bergstedt. Bergstedt discusses unidirectional printing exclusively.

He is not concerned with bidirectional printing, and does not face the problem of color shift arising from discrepancies in deposition order. The problem he addresses is color shift arising from discrepancies in drying/wicking times. He avoids or minimizes the appearance of such shifts by introducing offsets between bands of different colors—bands that overlap, to produce overprinted regions.

Bergstedt thus provides differential positioning as between swaths of individual colors. He discusses five different methods for accomplishing such offsetting of color bands. Two of his methods entail physical offsetting of different color pens—or different color nozzle arrays within a common, multicolor pen.

Besides not using bidirectional printing, the Bergstedt system—using physical offsetting—is of course antithetical to the problem which we address. Again, we aim to avoid deposition-order color shifts with pens that are substantially in-line.

A third method, of Bergstedt's five, does use in-line pens—but Bergstedt masks certain of the nozzles, near top or bottom of some pens, to provide the effect of staggered colors. In other words, he has in-line pens but not in-line swaths, and not in-line nozzle arrays.

It must be emphasized that in this method, as in all of his others, Bergstedt provides offsets between colors —that is, not between different multicolor swaths but rather between operations of the individual color-nozzle arrays, respectively. The significance of this distinction will become clear shortly.

Bergstedt mentions, however, that all his offsetting techniques summarized to this point do enable overprinting of colors together in a common pass. If this ability is exploited, in Bergstedt's unidirectional printing regime, the result for any of his first three methods will be to print overlapped swaths of multiple colors that are closely analogous to those created in the conventional two-pass printing mode (FIG. 8) we have described above.

It is important to recognize what would happen should Bergstedt attempt to operate his system bidirectionally. In any pixel rows where colors are overprinted together in a single pass, the deposition-order color shift which we have described would materialize. Thus the physical offsetting which Bergstedt describes is powerless to prevent color shifts that are caused by deposition order variation, in bidirectional printing.

In his fourth and fifth methods, Bergstedt uses inline pens but introduces his intercolor offsets through differential movements of the printing-medium advance mechanism, with respect to each color. In other words, he periodically backs up the print medium preparatory to printing of a certain primary color or colors.

Then he operates the advance mechanism forward again in preparation for printing of a certain other primary or primaries. If preferred he equivalently holds the printing medium stationary but moves the entire transverse-scanning mechanism backward along the medium-advance axis, prints a certain primary, and then moves the scan mechanism forward along the same axis and prints others.

Of course this method employs movements of, or relative to, the entire carriage and pen assemblage considered as a unit. Nevertheless, once again the point of these cyclical reversals is to provide relative positioning differences as between different colors.

Thus as Bergstedt emphasizes "these methods require that one pass of the printhead across the medium be made for each primary color deposited." With a separate pass for each color, whether laid down unidirectionally or bidirectionally, Bergstedt can provide much more consistent drying times.

He can thereby achieve excellent uniformity of secondary and compound colors—but at the cost of very low throughput. This cyclical-reversal strategy therefore is very much contrary to our present interest in producing uniform color as part of bidirectional printing for high throughput.

For best results Bergstedt advocates printing each color in an entirely separate pass—offset by the full common height of the nozzle arrays for the different colors (FIG. 10). In this favored mode, his pens never overprint two primaries in the same pass, since by definition of the geometry different primaries are laid down, on any given pixel row, in different passes.

Furthermore necessarily the cyan pen c (FIG. 10), magenta pen m and yellow pen y always reach each portion of the printing medium in that order, without variation. As a comparison with the in-line configuration (FIG. 1) makes clear, however, the resulting print zone is four times as long as the print zone of the present invention. Any such extension—even a relatively small fractional one—is very undesirable, as explained at the beginning of this section of the present document.

Bergstedt's discussion of drying-time color shift is relevant to the present invention in the sense that such a color shift forms a constraint on the use of embodiments of the present invention. This will be seen in the DETAILED DESCRIPTION section.

Another system has been used in a printer of the Epson Company, designated its model Stylus™ 720. Here inline color pens with nozzle spacing of 3½ nozzle/mm (90 nozzle/inch), along the print-medium-advance axis, are used to create a pixel-grid spacing of about 14 or 28 pixel/mm (360 or 720 pixel/inch).

Figure 11:
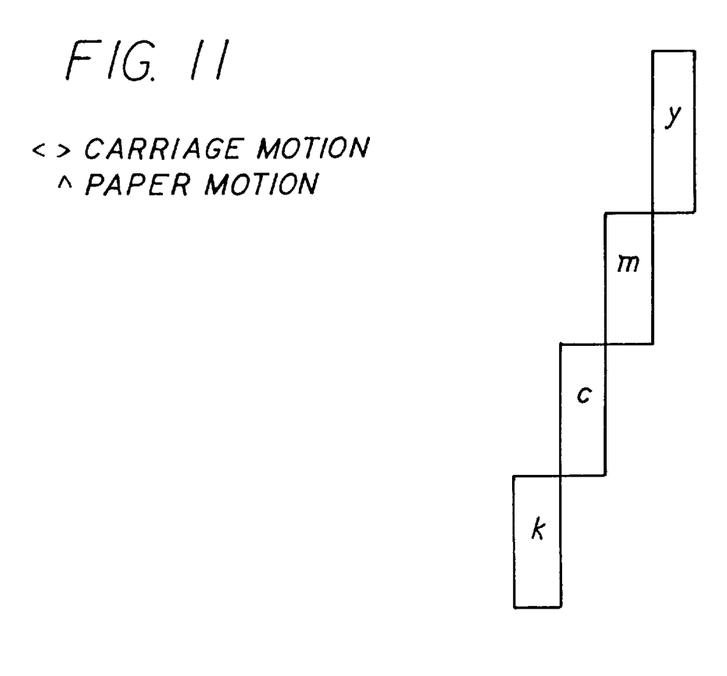
FIG. 11 is a plan like FIG. 1 but for full-height-offset pens.
Figure 12:
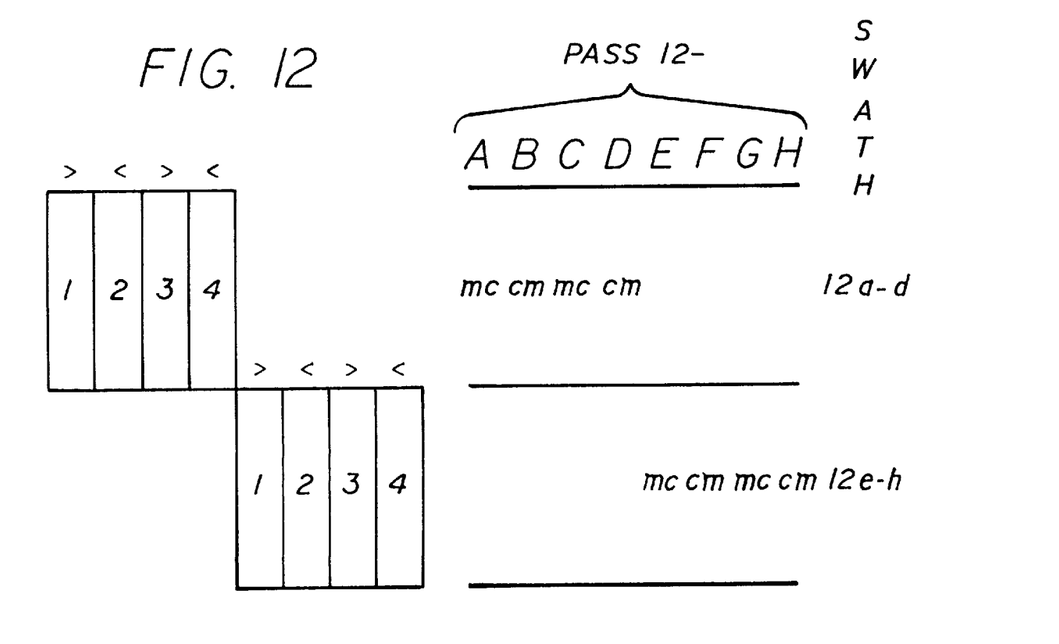
FIG. 12 is a diagram like FIGS. 2 through 5, and FIGS. 9 and 10, but for very fine (too small to be visible in the diagram) interleaving advances—in combination with a full-height advance.

This is done by advancing the medium through very small increments equal to the pixel spacing, e.g., $\frac{1}{14}$ mm ($\frac{1}{360}$ inch), between bidirectional passes 1–4 (FIG. 11). In other words, the system makes three consecutive advances (too small to be visible in the diagram) each one-quarter of the nozzle spacing.

Depending on the height of the nozzle array, each of these advances may, representatively, amount to only some one to three percent of the full nozzle-array height. These are followed by a much larger advance, e.g. ninety-seven to ninety-nine percent of the full height, to complete a full array-height excursion.

The overall pattern may be regarded as essentially four interleaved single-pass swaths 1–4 (FIG. 11) per cycle. It is essential to note that the pixel-row spacing (roughly 0.3 mm) produced within each swath individually —in other words, the spacing of the nozzles along the print-medium advance axis—is very different from the overall pixel-row spacing (about 0.07 or 0.035 mm) of the image.

The primary print order is the same from swath to swath, though it varies from row to row within each swath. While resolving deposition-order defects, this system is subject to the same problems of medium-advance defects as the abutted, nonoverlapping swaths discussed earlier.

Conclusion—Thus deposition-order color artifacts, and operating constraints imposed by their related drying-time artifacts, have continued to impede achievement of uniformly excellent inkjet printing at high throughput. Thus important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is an apparatus for printing a desired color image on a printing medium. The apparatus prints by construction from individual color marks formed in a multicolor pixel column-and-row array, for the image, by scanning multiple-nozzle pen means that operate in conjunction with a printing-medium advance mechanism. The array has an overall pixel-row spacing for the image.

The printing apparatus includes some means for forming on the medium successive swaths of color marks. For purposes of breadth and generality in discussing the invention, we shall call these means the "forming means".

Each swath has multiple pixel rows, and each row has marks of multiple primary colors. This condition departs from the Bergstedt method, in which swaths of different colors are partially or fully offset from each other.

(As will be understood, we are here describing the operating capability of the invention, not necessarily the way in which an individual user may choose to use it. For example, if a particular portion of a desired image is all of one or two primary colors, then actual rows of pixels for that portion of the image will have only one or two, not multiple, primary colors.)

The pixel rows are at the overall pixel-row spacing of the image. As will be understood, this condition diverges from the interleaving configuration of the Epson printer described earlier.

The apparatus also includes some means for offsetting the successive swaths by unequal distances along the advance axis, in forming substantially an entire image. Again for purposes of generality and breadth we shall call these the "offsetting means".

Operation of the offsetting means over "substantially an entire image" is recited simply to distinguish systems that use different advance distances only in limited regions of the image or printing medium. An example is the previously described special structure of advances used to overcome an end-of-page defect—which of course fails to address the color-shift problem taken up here.

The foregoing may constitute a description or definition of the first facet of the invention in its broadest or most general form. Even in this general form, however, it can be seen that this aspect of the invention significantly mitigates the difficulties left unresolved in the art.

In particular, the use of unequal offsets enables creation of some swaths that are very shallow and other swaths that are relatively tall. By arranging the offsets in relation to the scanning directions, it is possible to confine all the colors of one cast to the shallow swaths and all the colors of an opposite cast to the tall swaths.

For suitable inks, a small color difference between shallow and tall swaths can be relatively inconspicuous, because an observer tends to ascribe the color of the dominant larger area to the entire ensemble.

Although this aspect of the invention in its broad form thus represents a significant advance in the art, it is preferably practiced in conjunction with certain other features or characteristics that further enhance enjoyment of overall benefits.

For example, it is preferred that the forming means include plural pens, pens that are substantially in-line, for marking in respective different colors. We also prefer that the offsetting means include means for varying the offset distances cyclically—and, more particularly, that the offsetting means include means for alternating large and small offsetting distances.

It is also preferred that the offsetting means include means for restricting all offsetting of successive swaths to substantially a single common direction along the advance axis. In a different useful embodiment, however, it is preferred that the offsetting means include means for offsetting in alternating opposite directions.

A second aspect of the invention is a method for printing a desired color image on a printing medium, by construction from individual color marks formed in pixel column-and-row arrays by scanning multiple-nozzle pens that operate in conjunction with a printing-medium advance mechanism. The pixel rows of the image have an overall pixel-row spacing.

This aspect of the invention includes the step of forming on such medium successive swaths of color marks—the "forming step". As in the apparatus aspect of the invention described above, each swath has multiple pixel rows at the overall pixel-row spacing of the image, and each row has marks of multiple primary colors.

This aspect of the invention also includes the step of offsetting the successive swaths by cyclically unequal distances along the advance axis. This step does not correspond exactly to operation of the "forming means" recited above as part of the first aspect of the invention.

More specifically, here we do not necessarily perform the offsetting step over an entire image, but instead we require that it be performed cyclically. This cyclical requirement, not a part of the first aspect of the invention, distinguishes end-of-page advance methods and systems such as those taught by Broder et al.

The foregoing may constitute a description or definition of the second facet of the invention in its broadest or most general form. Even in this general form, however, it can be seen that this aspect of the invention too significantly mitigates the difficulties left unresolved in the art.

In particular, the second aspect of the invention—like the first—enables use of strongly mismatched swath heights. As before, such mismatch helps to conceal color shifts by concentrating the observer's attention on the relatively larger fields of one particular cast.

This second aspect of the invention, however, also has another advantage. It accommodates images which have various portions of respectively different character.

For example, an image may have in some regions solid fields of color. It may have in other regions for example black-and-white text—or a detailed halftone picture.

A solid-color region of such an image may be better printed using the second, cyclical-advance aspect of the invention—i.e., repeating some pattern of unequal advances, while in that region. Text or picture regions may be better (or equally well) printed conventionally.

Although this second aspect of the invention in its broad form thus represents a significant advance in the art, it is preferably practiced with other features or characteristics that further enhance enjoyment of overall benefits. For example, preferences described above for the first main aspect of the invention are applicable here as well.

In a third basic aspect or facet, the invention is an apparatus for printing a desired color image on a printing medium. It prints by construction from individual color marks formed in a pixel column-and-row array for the image —with, as before an overall pixel-row spacing for the image—by scanning multiple-nozzle pen means that operate in conjunction with a print-medium advance mechanism.

Secondary colors formed by the pen means are subject to undesirable color shift from various causes. Included among these causes are varying order of primary-color deposition, as mentioned in the "BACKGROUND" section of this document.

In its third aspect, the apparatus of the invention includes some means for forming bidirectionally on such a medium, along a scan axis, successive multicolor swaths of color marks. These "forming means" have a maximum available swath height.

Each swath has multiple pixel rows, spaced apart at the overall pixel-row spacing of the image. Each row has marks of multiple primary colors.

Furthermore these forming means include plural, substantially in-line pens for marking in respective different colors. By "in-line" we mean that the pens are not staggered, as they are in some of the earlier systems described in the BACKGROUND section, but rather are mutually aligned.

By "substantially" in-line we mean to allow for the possibility that the pens may be slightly misaligned— enough, for example, to require compensation by masking off a few nozzles at one or the other end of the nozzle array—but yet may be intended and able to function as in-line pens for most purposes, such as for example printing textual and pictorial image elements.

The apparatus of this third aspect of the invention also includes some means for eliminating color shift that results from varying order of primary-color deposition, in the process of the bidirectional forming of marks on the printing medium. These means, which for reasons suggested earlier we will call the "eliminating means", operate by causing the order of primary-color deposition in the bidirectional forming to be consistent.

In other words, the eliminating means (unlike the above-introduced offsetting means considered alone) actually eliminate the cause of deposition-sequence color shifts. As will be understood, however, these means do not necessarily eliminate—and in fact do not usually eliminate—color shifts that may arise from other causes, as for instance differences in drying time between underprinted and overprinted primaries.

The eliminating means include some means for using less than the maximum available swath height.

The foregoing may be a definition or description of the third aspect of the invention in its broadest or most general form, but even as thus broadly couched this third facet of the invention can be seen to advance the art. In particular the use of less than maximum available swath height provides an additional degree of freedom which makes possible bidirectional printing with consistent primary-deposition order and consistent advance direction.

Accordingly in using this third facet of the invention we prefer to employ a consistent advance direction. We also prefer to enhance this form of the invention through, for example, use of cyclically unequal advance distances.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

In accordance with preferred embodiments of the invention, each color cyan (c, FIG. 1), magenta m, yellow y and black k is carried in a respective single pen. The four pens are arranged side by side, and substantially inline as shown, on a common carriage mounted for transverse motion to the right (>) and left (<)—these directions defining a so-called "scan axis".

The pen assembly cmyk and the print medium are mounted for relative motion, or "advance", along a so-called "printing-medium advance axis" or simply "advance axis". This advance axis is at right angles to the scan axis—more specifically, up and down, as drawn in the diagrams of FIGS. 2 through 5.

These components will create a pixel grid on the printing medium, for use in constructing an image as an array of pixel columns and rows. That pixel grid has, for the image, a pixel-row spacing of, e.g., about 1/24 mm (1/600 inch).

Each pen cmyk has a multiplicity of nozzles—for example three hundred nozzles—spaced, as resolved along the printing-medium advance axis, at the pixel-row spacing of the image. The nozzle spacing thus is not some multiple of that image row spacing, such as the multiple four used in the Epson printer discussed earlier.

Thus all four pens have a common nozzle spacing, and a common alignment, along the advance axis. In the course of scanning to left or right, in general all the pens will fire at various respective pixel locations along every pixel row.

Thus each representative row has ink spots or marks of multiple primary colors. Again, this differs from the Bergstedt system in which color swaths are in general printed offset (though in many pixel rows that system does deposit multiple colors).

As will be recalled, Bergstedt's system provides swath offsetting by physical displacement of pens or nozzle arrays in the carriage, or by masking of in-line pens —or by periodic advance-mechanism reversals, arranged to enable separate printing of a swath of each color in a different respective location along the the advance axis.

In a first preferred embodiment, the printing medium advances by two unequal distances in alternation—although more complicated cyclical arrangements are just as well within the scope of the invention. A relatively short advance distance is used between each rightward sweep 1 (FIG. 2) and its succeeding leftward sweep 2; and a relatively long advance between each leftward sweep 2 and its succeeding rightward sweep 1.

Figure 2:
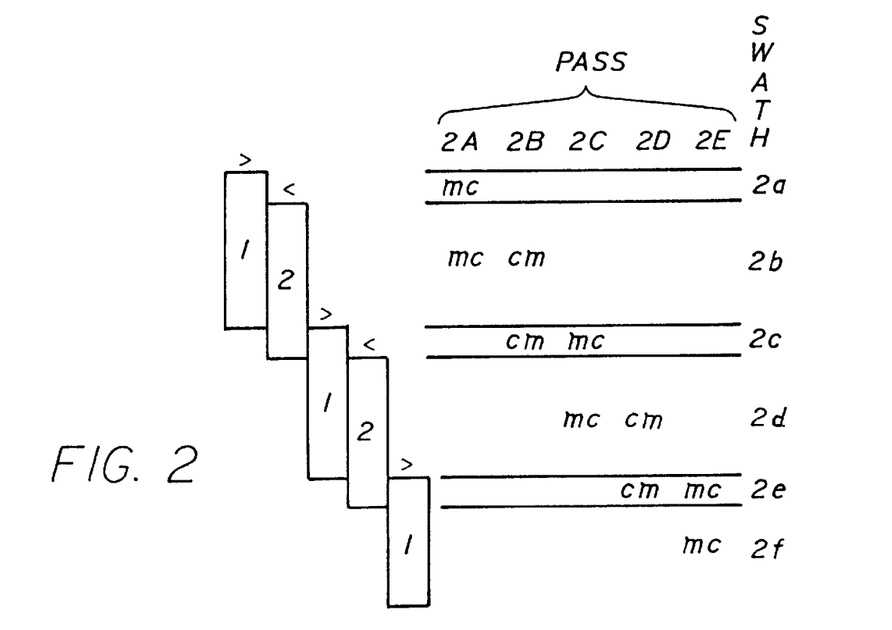
FIG. 2 is a diagrammatic print-mask representation of inking patterns used in one preferred embodiment of the invention that minimizes the conspicuousness of deposition-order color shifts by alternating unequal advance distances.

Thus every other advance is short—between odd and even passes 2A and 2B, and 2C and 2D. The alternate passes are long, as between even and odd passes 2B and 2C, and 2D and 2E. Thus odd subswaths 2a, 2c, 2e are shallow, whereas even subswaths 2b, 2d are tall.

In purest principle, this system has the same color banding defect as described above for FIG. 8. We have found, however, that many subtle color shifts are less easily perceived between large and small areas.

The large areas dominate the small ones, and the eye and brain tend to disregard minor color differences. In effect, an observer unconsciously ascribes the color of the large area to both areas.

The different advance lengths mentioned above cause the subswaths or subbands of very slightly different colors to also have greatly different areas—smaller in the shallow odd subswaths 2a, 2c, 2e; and larger in the tall even subswaths 2b, 2d. The psychophysical effect just described can then interact with this areal difference to make the color difference relatively inconspicuous.

This effect is not uniform for all color pairs. We have accordingly found that it is necessary to test carefully, for any given ink combination, to determine whether this technique of FIG. 2 is adequate in camouflaging color shifts due to deposition order.

Where the unequal-advance technique is effective, it is usually maximized by providing a very large difference between advance distances. Thus for one exemplary set of inks, with pens that have three hundred nozzles, we currently prefer an advance of twelve pixel rows for the shorter advance, and two hundred eight-eight rows for the longer.

In consequence, although this system proceeds with a sort of limp, its average advance is (12+288)/2=150, or half the height of the nozzle array, just as in the conventional two-pass bidirectional system (FIG. 8) discussed earlier. Accordingly throughput for these two systems is the same.

A second preferred embodiment eliminates, rather than camouflaging, deposition-order variations. This is accomplished by alternately reversing advance direction, in synchronism with scanning direction.

The principal constraint is that the final pass made over every relevant region of the image must always be in the same direction. (By "relevant region" we mean every region in which color banding can be a problem.)

Reinspection of FIG. 2 (or FIG. 9) reveals that color banding arises because the final pass 2D in each odd subswath 2c is formed with the carriage traveling rightward mc; whereas the final pass 2B, 2D in each even subswath 2b, 2d is formed with the carriage traveling leftward cm. The color cast is therefore cyan c in each odd subswath 2c, alternating with magenta m in even subswaths 2b, 2d.

Figure 3:
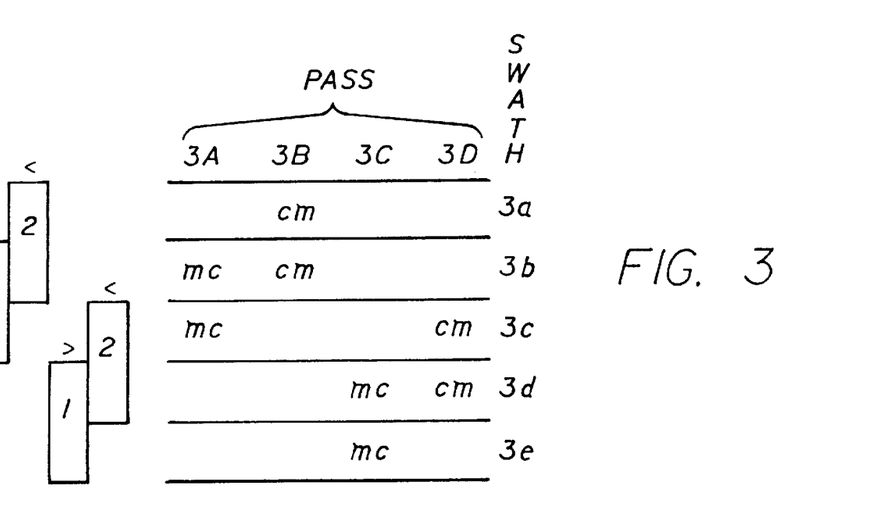
FIG. 3 is a like diagram for a second preferred embodiment that eliminates deposition-order variations by alternately reversing advance direction.

In FIG. 3 by comparison, every leftward sweep 2, cm is printed over a previous rightward-formed sweep 1, mc. In other words, every rightward pass 3A, 3C is covered by a later leftward pass 3B, 3D.

The final pass 3B, 3D in every subswath is always leftward cm, and the cast due to deposition order is therefore always consistently magenta m. Thus with respect to color shifts caused by varying deposition order, this embodiment is plainly better.

A reverse advance of half the nozzle-array height can be executed between each rightward pass 1 (FIG. 3) and its succeeding leftward pass 2. To compensate for this loss of ground, a forward advance of one and a half times the nozzle-array height can be executed between each leftward pass 2 and its succeeding rightward pass 1. Once again the average advance and therefore throughput are the same as in a conventional two-pass bidirectional system.

This description of advance-mechanism reverses may invoke recollection of the reverses taught by Bergstedt to avoid drying-time variations and their resulting color shifts. Bergstedt's system, however, as will be recalled operates in terms of offsetting separated colors; the present system instead always prints full multicolor swaths—i.e., multiple primaries in general occur in every pixel row that is created in every sweep. What our system displaces, or positions differentially, is not separated colors but rather sweeps in opposite directions.

In this embodiment the heights (or areas) of all subswaths are equal. Unfortunately, this equal-height characteristic of the second embodiment sometimes interacts acts unfavorably with another of its characteristics. There is a significant difference in interpass drying time in each even subswath 3b, 3d compared with each odd subswath 3c.

In particular each even subswath 3b, 3d has a rightward sweep 1, 3A, 3C overprinted by a leftward sweep 2, 3B immediately. An odd subswath 3c has a rightward sweep 1, 3A overprinted by a leftward sweep 2, 3D only after a delay of two quiet intervals 3B, 3C during which the earlier-deposited ink dries, and wicks into the printing medium if it is paper or other relatively absorbent material.

Such differential delays, too, can produce an undesirable color shift—the target, as will be recalled, of the Bergstedt patent. For example in one ink system which we investigated the artifact was negligible for blue but objectionable for green and red.

We have found that the acceptability of this alternate-reverse embodiment, with respect to drying-time color shifts, varies strongly with the particular inks in use. Thus, as with the unequal-advance embodiment (FIG. 2) discussed above, careful testing to determine the efficacy of the alternate-reverse embodiment (FIG. 3) is essential before deciding whether to adopt it for any particular combination of inks.

A third preferred embodiment combines characteristics of the first two, to minimize the conspicuousness of color shifts due to drying time as well as those due to deposition order. This embodiment has both unequal and reversed advances.

Figure 4:
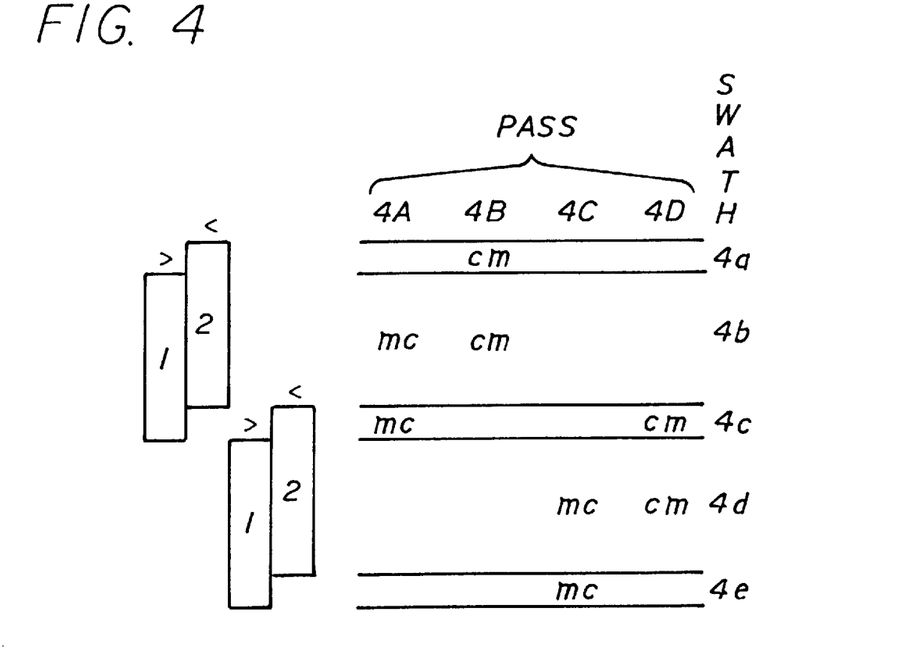
FIG. 4 is a like diagram for a third preferred embodiment that combines unequal and reversed advances to also minimize the conspicuousness of drying-time color shifts.

Here the advance takes a reverse step that is small. With three-hundred-nozzle pens, for example, this step is about twelve rows. It occurs between each rightward sweep 1 and its succeeding leftward sweep 2.

The system then compensates with a 312-row step forward, between each leftward sweep 2 and its succeeding rightward sweep 1. This embodiment thus makes its way with a distinct lurching gait. Nevertheless once again on average the distance of advance is the same as in a conventional two-pass bidirectional system, and there is no throughput penalty.

More specifically the reverse advance occurs between odd passes 4A, 4C and their respectively succeeding even passes 4B, 4D. As a result odd subswaths 4a, 4c are shallow, whereas even subswaths 4b, 4d are tall.

This third embodiment (FIG. 3) bears a relationship to the second embodiment (FIG. 2) which is in a sense analogous to the relationship between the first embodiment (FIG. 1) and a conventional two-pass bidirectional system (FIG. 9). That is, this third embodiment has the same drying-time artifact as described above for the second embodiment - but restricts one of the two mismatched casts to a very shallow swath (here the odd swaths) 3c.

The slight difference in color is not as readily perceived, or in other words is less conspicuous, because of the dominance of the color in the large areas of the taller (here even) swaths 3b, 3d. Here yet again, however, we have found that the effectiveness of this camouflage is highly variable with ink systems and must be checked before deciding whether to adopt it.

Another limitation of the second and third embodiments is that not all mechanical systems for print-medium advance can execute a reverse step and remain in good registration. Apart from ordinary incidence of backlash and print-medium hysteresis, some systems use special drives that were never intended to back up gracefully.

For instance some worm drives are biased laterally to maintain reliable engagement. Backing up such a drive can cause the mechanism to jump transversely—that is, in the scan axis—creating confusion not only as between pixel rows but between pixel columns as well.

Hence it is essential to verify performance of system mechanics before deciding whether to incorporate the second or third preferred embodiments into a printer.

Our invention also has a fourth preferred embodiment that provides the same benefits as the third embodiment, but without reverses. This is accomplished by masking.

In this embodiment the printing medium advances in only one direction, thus avoiding the mechanical limitations of the second and third embodiments discussed above. The forward advances are conceptually the same as in the first embodiment (FIG. 1), but we mask off the top of each pen in each rightward sweep 1 (FIG. 5) and the bottom of each pen in each leftward sweep 2.

Once again the masking employed by Bergstedt is a differential masking as between nozzles that print different colors. Ours is as between sweeps made in opposite directions.

Figure 5:
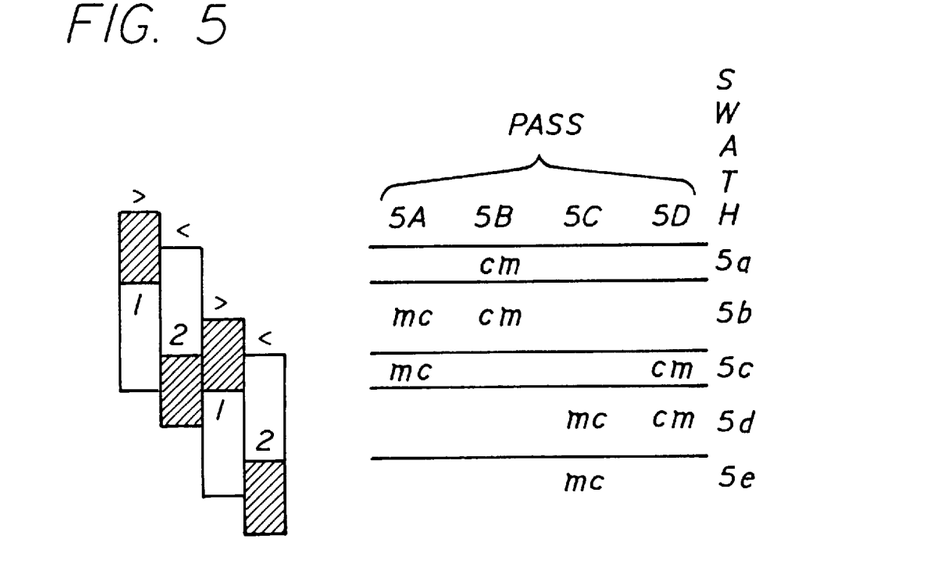
FIG. 5 is a like diagram for a fourth preferred embodiment that provides the same benefits as the third embodiment but by masking rather than reversed advances the extent of masking being shown exaggerated.

The top-end masking (shaded upper portion of each rightward sweep 1) is such that leftward sweeps 2 always overprint rightward sweeps 1. Thus in a rightward-sweeping odd pass 5C we refrain from using an uppermost portion of the pen which would otherwise overprint the bottom end of the leftward-swept even subswath 5b formed in the immediately preceding even pass 5B.

Furthermore, also in each odd pass 5C we refrain from using an adjacent portion of the pen just below that uppermost portion—namely, a portion that would otherwise double-print a previously rightward-swept odd subswath 5c. (Both these unused portions contribute to the shaded upper portion of each sweep 1.)

The bottom-end masking (shaded lower portion of each leftward sweep 2) is such that the lowermost subswath 5c of a rightward sweep 1, e.g. pass 5A, is never over4 printed by the bottom of the pen in the immediately following leftward pass 5B. Rather the overprinting is deferred for two passes until after the abutting rightward pass 1 has been laid down in pass 5C.

In this way the necessary portions of both abutting rightward passes can properly underlie the leftward overprinting. Those necessary portions include the uppermost subswath 5d of the later rightward pass 5C, as well as the lowermost subswath 5c of the earlier rightward pass 5A.

In summary, this fourth embodiment—like the third produces no deposition-order variation (or associated color shift) at all; and it tends to render drying-time-derived color shifts inconspicuous through use of differential subswath heights 5b, 5c etc. as between subswaths of opposite cast. Thus this system too requires evaluation in regard to ink-dependent effects.

Unlike the third embodiment, this fourth embodiment is free of advance-mechanism reverses. A price paid for this mechanical benefit is that less than the entire pen height is available for use, leading to a loss of throughput.

This throughput loss, however, is not as great as might be supposed from the masking patterns of FIG. 5, which are drawn exaggerated for clarity of the foregoing conceptual discussion. Furthermore the invention preserves the full, unmasked height of the pens, as well as the bidirectional in-line-pen capabilities of the printer —so that these characteristics advantageously remain available for conventional use in images of other types, and in other parts of the same image as mentioned earlier.

Figure 6:
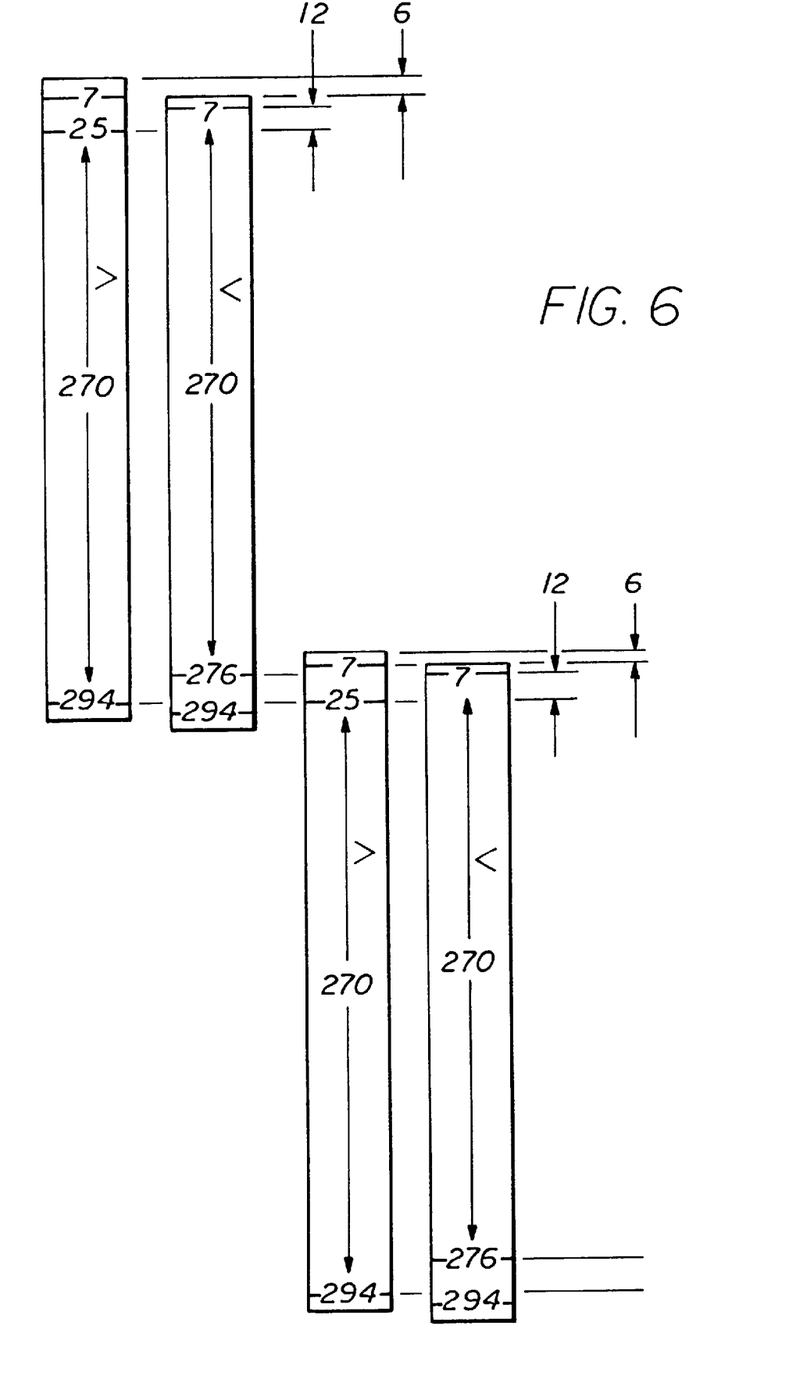
FIG. 6 is a diagram like FIG. 5 but enlarged and showing greater detail of particular masking proportions.

In a representative implementation of the FIG. 6 embodiment, the printhead for each color has three hundred nozzles. Six nozzles at the top and bottom of the printhead (nozzles 1 through 6—see FIG. 6—and 295 through 300) are reserved for alignment of the printheads to each other.

This leaves, for printing, a zone of two hundred eighty-eight contiguous nozzles. For alignment purposes this usable zone can be selected upward or downward, independently of whether printing is unidirectional or bidirectional, but for definiteness in the following discussion we will refer to the nominal calibration in which the zone of use spans nozzles 7 through 294.

We begin rightward sweeps 1 (FIG. 6) with nozzles 25 is through 294, for a total of two hundred seventy nozzles. The leftward sweeps 2 are nominally with nozzles 7 through 276, also amounting to a swath of two hundred seventy nozzles.

Between each rightward sweep 1 and its succeeding leftward sweep 2, the medium is advanced six rows—represented in FIG. 6 by a downward shift of the sweep 2. The net effect is that the second, leftward sweep 2 is 25−7−6=12 rows higher than the preceding first, rightward sweep 1.

This relationship simply reflects more precisely the higher position of combined odd subswaths 5a, 5b (FIG. 5) relative to combined even subswaths 5b, 5c.

After the leftward sweep 2 (FIG. 6) the printing medium is advanced 270−6=264 rows in preparation for the next rightward sweep 1'. The cycle is then repeated.

Assuming a usable page height of 26⅔ cm, at 236 pixel rows per centimeter (10½ inches, at 600 pixel rows per inch), the embodiment under discussion constructs a pixel grid of 6,300 rows on a page. In conventional two-pass unidirectional operation, this number of pixel rows would require 2×6300/288=43.75→44 sweeps. (The number of sweeps must be integral.)

For comparison with our bidirectional embodiments, we must adjust this result by adding an equal number of nonprinting retrace sweeps. (For purposes of this calculation we assume that a retrace must follow even the final forward sweep on the page—to return the pens to the left side of the carriage before starting to feed a new page. Here the pens must be returned before printing the new page, lest alternate pages have opposite color cast.)

The forty-four forward sweeps, however, are performed at about 51 cm/sec (20 in./sec), and the nonprinting retrace sweeps at about 91½ cm/sec (36 in./sec). For a usable page width of 20⅓ cm (8 inch), and ignoring turnaround times, these eighty-eight sweeps take a total of roughly (44×20⅓ cm÷51 cm/sec)+(44×20⅓ cm÷91½ cm/sec)=17½ seconds for forward sweeps+9¾ seconds for retrace sweeps=27¼ seconds total. Based on these considerations alone, the corresponding very roughly estimated throughput is 2.2 pages per minute.

Our present two-pass bidirectional system, due to masking, instead requires a greater number of sweeps, 2×6300/270=46.67→48. For worst-case calculation we note that the bidirectional system may require the number of sweeps to be not only integral but also even—again to return the pens to the left side of the carriage before feeding a new page. (This step could be omitted at the cost of some complexity in using a complementary masking scheme for even-numbered pages in the sequence.)

For the same usable page width, again ignoring turnaround, these forty-eight sweeps take a total of roughly 48×20⅓ cm÷51 cm/sec=19 seconds. Roughly estimated throughput thus comes to about 3.2 pages per minute.

These numbers represent about 19/27¼≅32 0.7 the time required for unidirectional printing, or 27¼/19=1.4 times greater throughput—notwithstanding the printing capacity lost to masking as shown in FIGS. 5 and 6.

Allowing for turnaround and interpage functions, our actual overall two-pass throughput estimates are of course slower: about 1.4 pages per minute with unidirectional printing and 2.0 pages per minute for bidirectional. The advantage of the present invention, however, remains clear.

Figure 7:
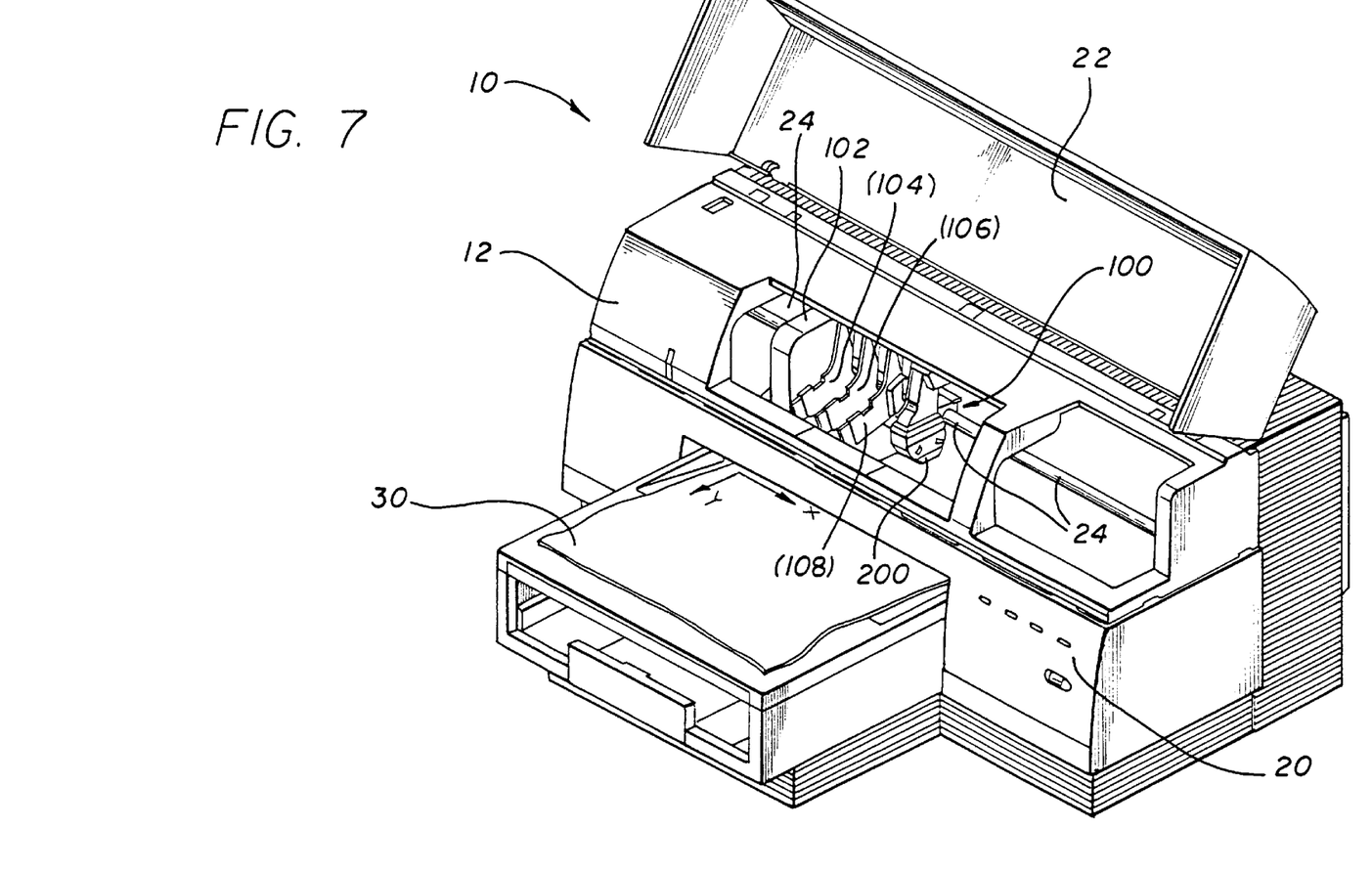
FIG. 7 is an isometric or perspective view of a representative printer or printer/scanner/copier embodying preferred embodiments of the present invention.

The invention is advantageously embodied in a desktop computer-controlled printer or printer/scanner/copier 10 (FIG. 7) for home or office use, or in a larger-scale computer-controlled printer/plotter for the drafting room or engineering design facility. Such a device, of either of these basic types, typically has a case 12, control panel 20, hinged cover 22, and provision for supplying printing medium 30 in sheet, roll or fanfold form (and, particularly in desktop systems, provision for receiving the image-bearing medium after printing).

Figure 8:
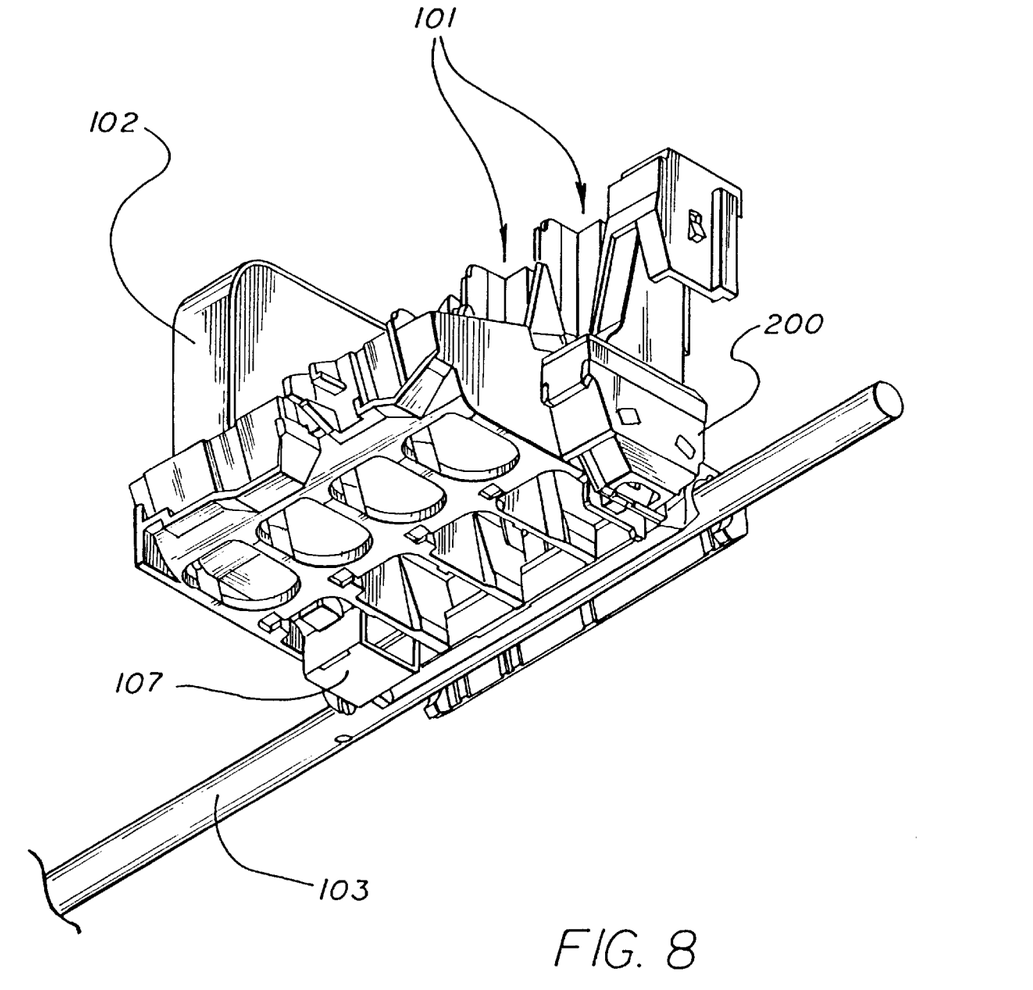
FIG. 8 is a like view, but enlarged, of pens in a transversely scanning carriage, with an orthogonal print-medium advance mechanism.

Such a device also ordinarily includes in-line pens. In FIG. 8 one such pen 102—with its downward-depending printhead 107—is shown adjacent three empty bays 101 for other pens (104), (106), (108).

Four pens are thus mounted together in a bidirectionally, transversely scanning carriage 100 with an adjacent encoder strip 24 for position control. The carriage 100 moves on a guide and support rod 103, along the scan axis indicated in the drawing by a laterally-directed arrow x.

Also included is an orthogonal print-medium advance mechanism, which is symbolized in the drawing by the outward-directed arrow y. This arrow represents the print-medium advance axis too.

An optical sensor 200 rides with the pens on the carriage. It is for use in the interpen calibrations mentioned earlier, and also for other auxiliary functions which advantageously include warning of low ink supply, monitoring of print quality, and paper-edge detection.

The above disclosure is intended as merely exemplary, and not to limit the scope of the invention—which is to be determined by reference to the appended claims.

What is claimed is:

1. Apparatus for printing a desired color image on a printing medium, by construction from individual color marks formed in an overall pixel column-and-row array for the image, with an overall pixel-row spacing for the image, by scanning multiple-nozzle pen means that operate in conjunction with a printing-medium advance mechanism; said printing apparatus comprising:

means for forming on such medium successive multicolor swaths of color marks, each swath having multiple pixel rows at said overall pixel-row spacing of the image, and each row having marks of multiple primary colors; and means for offsetting the successive swaths by unequal distances along the advance axis, in forming substantially an entire image.

2. The apparatus of claim 1, wherein:

the forming means comprise:

for each one of plural primary colors, pen means for forming on such medium a group of marks of that primary color, said group of marks being generally arrayed along the advance axis, a carriage for holding all the pen means substantially side-by-side in a particular order, and for repeatedly carrying all the pen means together over such medium, along a scan axis, to form on such medium successive swaths of marks of all the primary colors, and means for controlling the pen means to form secondary colors by overprinting primary colors in accordance with said particular order of the pen means and a direction of said carrying; and the offsetting means comprise:

advance means for causing relative motion of the carriage and such medium along the advance axis periodically, between formation of successive swaths, for arraying multiple swaths of marks on the medium to form such color image, and means for controlling the advance means to cause successive relative motions to be unequal, substantially along the entire color image.

3. The apparatus of claim 1, wherein:

the forming means comprising plural substantially inline pens for marking in respective different colors.

4. The apparatus of claim 1, wherein:

the offsetting means comprise means for varying the offsetting distances cyclically.

5. The apparatus of claim 4, wherein:

the offsetting means comprise means for alternating small and large offsetting distances.

6. The apparatus of claim 5, wherein:

the offsetting means comprise means for restricting all offsetting of successive swaths to substantially exclusively a single common direction along the advance axis.

7. The apparatus of claim 5, wherein:

the offsetting means comprise means for offsetting successive swaths in alternating opposite directions along the advance axis.

8. The apparatus of claim 1, wherein:

the offsetting means comprise means for restricting all offsetting of successive swaths to substantially exclusively a single common direction along the advance axis.

9. The apparatus of claim 8, wherein:

the forming means have a maximum available swath height;

the offsetting means comprise means for using less than the maximum available swath height.

10. A method for printing a desired color image on a printing medium, by construction from individual color marks formed in an overall pixel column-and-row array for the image, with an overall pixel-row spacing for the image, by scanning multiple-nozzle pen means that operate in conjunction with a printing-medium advance mechanism; said method comprising the steps of:

forming on such medium successive multicolor swaths of color marks, each swath having multiple pixel rows at said overall pixel-row spacing of the image, and each row having marks of multiple primary colors; and offsetting the successive swaths by cyclically unequal distances along the advance axis.

11. The method of claim 10, wherein:

the forming step comprises using plural substantially in-line pens for marking in respective different colors.

12. The method of claim 10, wherein:

the offsetting step comprises alternating small and large offsetting distances.

13. The method of claim 12, wherein:

the offsetting step comprises restricting all offsetting of successive swaths to substantially exclusively a single common direction along the advance axis.

14. The method of claim 12, wherein:

the offsetting step comprises offsetting successive swaths in alternating opposite directions along the advance axis.

15. The method of claim 10, wherein:

the offsetting step comprises restricting all offsetting of successive swaths to substantially exclusively a single common direction along the advance axis.

16. The method of claim 15, wherein:

the forming step comprises using pens that have a maximum available swath height;

the offsetting step comprises using less than said maximum available swath height.

17. The method of claim 10, wherein:

the offsetting step comprises offsetting successive swaths in alternating opposite directions along the advance axis.

18. Apparatus for printing a desired color image on a printing medium, by construction from individual color marks formed in an overall pixel column-and-row array for the image, with an overall pixel-row spacing for the image, by scanning multiple-nozzle pen means that operate in conjunction with a printing-medium advance mechanism; secondary colors formed by said pen means being subject to undesirable color shift from various causes, including varying order of primary-color deposition; said printing apparatus comprising:

means for forming bidirectionally on such medium, along a scan axis, successive multicolor swaths of color marks, each swath having multiple pixel rows at said overallpixel-row spacing and each row having marks of multiple primary colors, said forming means having a maximum available swath height and comprising plural substantially in-line pens for marking in respective different colors; and means for eliminating color shift that results from varying order of primary-color deposition, in said bidirectional forming, by causing the order of primary-color deposition in said bidirectional forming to be consistent; and wherein said eliminating means comprise means for using less than the maximum available swath height.

19. The apparatus of claim 18, further comprising:

means for offsetting, along the advance axis, successive bidirectionally formed swaths; and means for restricting all offsetting of successive swaths to exclusively a single common direction along the advance axis.

20. The apparatus of claim 19, wherein:

the eliminating means further comprise means for controlling the offsetting means to offset successive swaths by cyclically unequal distances along the advance axis.

* * * * *

UNITED STATES PATENT AND TRADEMARK OFFICE
CERTIFICATE OF CORRECTION

PATENT NO. : 6,086,181
DATED : July 11, 2000
INVENTOR(S) : Mark W. Majette et al.

It is certified that error appears in the above-identified patent and that said Letters Patent is hereby corrected as shown below:

<u>Column 16,</u>
Line 49, after "mechanism", insert -- having an advance axis --.

<u>Column 17,</u>
Line 53, after "mechanism" insert -- having an advance axis --.

<u>Column 18,</u>
Line 31, after "mechanism" insert -- having an advance axis --.

Signed and Sealed this

Eighteenth Day of September, 2001

Attest:

*Nicholas P. Godici*

NICHOLAS P. GODICI
*Attesting Officer*     *Acting Director of the United States Patent and Trademark Office*